UNITED STATES PATENT OFFICE.

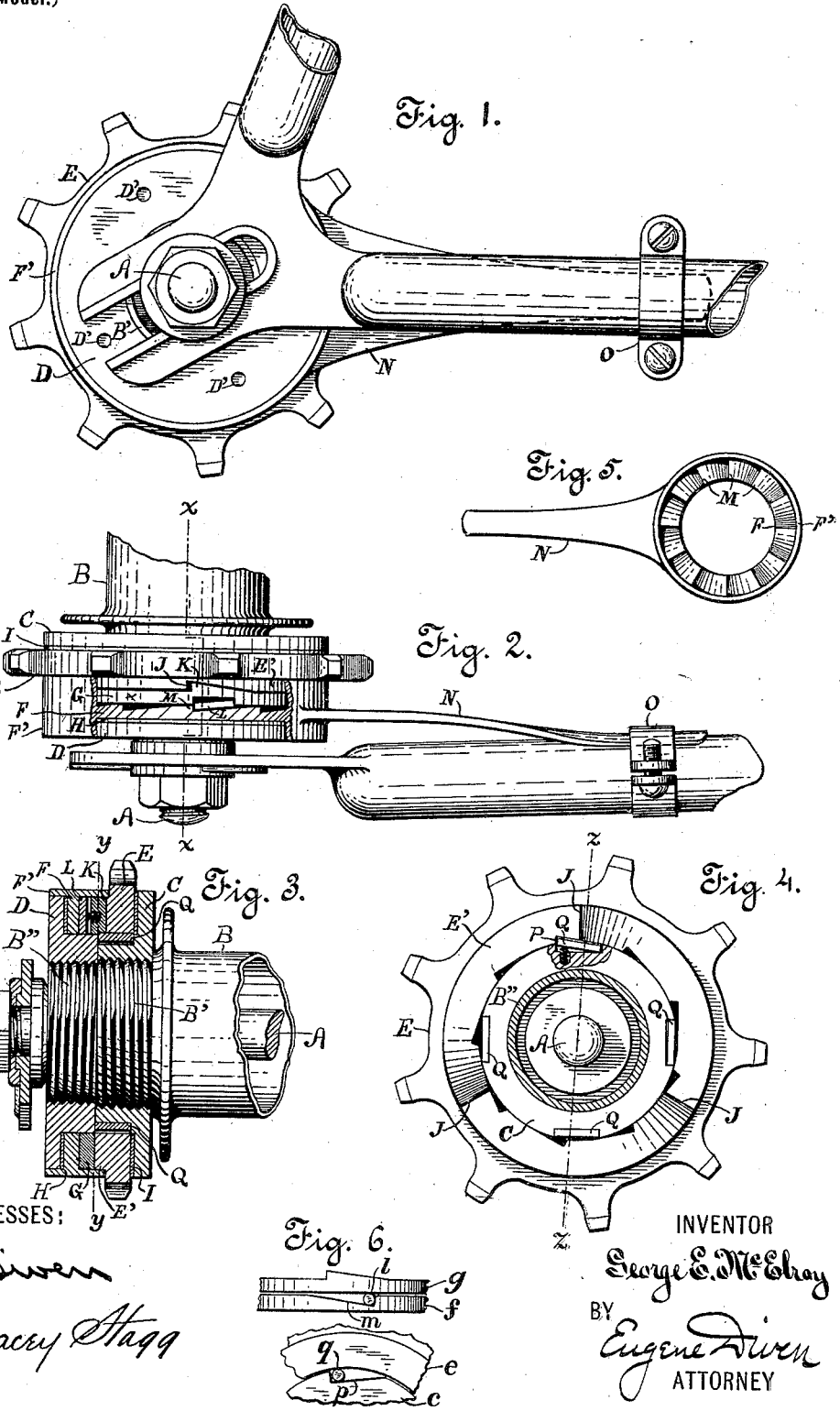

GEORGE E. McELROY, OF ELMIRA, NEW YORK.

BACK-PEDALING BRAKE.

SPECIFICATION forming part of Letters Patent No. 622,523, dated April 4, 1899.

Application filed October 18, 1898. Serial No. 693,849. (No model.)

*To all whom it may concern:*

Be it known that I, GEORGE E. MCELROY, a citizen of the United States, residing at Elmira, in the county of Chemung and State of New York, have invented a new and Improved Brake Mechanism for Bicycles and other Vehicles, of which the following is a specification.

My invention relates to improvements in brake mechanisms in which the braking power is applied to the hubs of the driving-wheels of bicycles and other motor-vehicles and in which the retarding power on the drive mechanism, as in back pedaling, serves to impede the forward movement of the driving-wheel proportionate to the amount of retarding force applied; and the objects of my improvements are, first, to provide means whereby when the driving power is held stationary the driving-wheel will be left free to turn forward, as in coasting, and, second, to provide means for applying friction to said driving-wheel to retard its motion when the driving power is turned backward. I attain these objects by the mechanism illustrated in the accompanying drawings, in which—

Figure 1 represents a side elevation of a driving-wheel hub attached to the rear-fork end of a bicycle and having my improvements applied thereto; Fig. 2, a plan view of the same with a portion of the dust-guard broken away to disclose the brake mechanism; Fig. 3, a longitudinal section on lines $x\ x$ in Fig. 2 and $z\ z$ in Fig. 4; Fig. 4, a transverse section on line $y\ y$ in Fig. 3; Fig. 5, a detail showing the stationary disk-plate detached and in reverse position, and Fig. 6 details showing modifications of the clutch devices.

Similar letters refer to similar parts throughout the several views.

A represents the axle of the driving-wheel, and B the hub. In the present instance the hub B is extended out to the left and provided with the right and left hand screw-threads B' and B". Upon these threaded portions of the hub are screwed collars carrying the friction-disks C and D. These collars are securely locked together when in place by the trend of the screw-threads and cannot be turned in either direction by the action of the sprocket-wheel. The two friction-disks form an annular runway or bearing in which are mounted the sprocket-wheel and the several parts of the brake mechanism. The sprocket-wheel E is loosely mounted in this bearing, with one face adjacent to the friction-disk C. The other or outer face of the sprocket-wheel is provided with a collar-like projection E', the face of this collar being provided with three incut wedge-bearings J J J. Adjacent the outer friction-disk D is located a stationary disk-plate F, the outer periphery of which is provided with an inward and outward turned flange F', which extends over the periphery of the friction-disk D and the collar E', forming a dust-guard for the inclosed mechanism. An arm N extends forward from the stationary disk-plate F and is clamped to the rear frame-brace by the screw-clamp O or other suitable fastening device. Between the stationary disk-plate and collar E' of the sprocket-wheel is the rotary disk-plate G. One face of this rotary disk-plate is provided with outcut wedge-bearings K, corresponding to and engaging with the wedge-bearings J on the collar E'. The outer face of the rotary disk-plate is provided with three recesses opposite the wedge-bearings, in which are located spring-actuated dogs or pawls L, adapted to engage a series of clutch-teeth M, cut on the inner face of the stationary disk-plate F. Between the friction-disk C and the sprocket-wheel and between the friction-disk D and the stationary disk-plate are located fiber washers I and H to prevent the wear of metal upon metal when the brake action is applied. The inner periphery of the sprocket-wheel E is provided with a series of clutch-teeth P, (see Fig. 4,) adapted to be engaged by the spring-actuated dogs or pawls Q, located in sockets on the collar of the friction-disk C.

In operation when the driving power is given a forward movement, as by the pedals in a bicycle, the sprocket-chain will drive the sprocket-wheel E forward or to the right and one of the clutch-teeth P will be brought into engagement with a dog Q on the collar of the friction-disk C. The sprocket-wheel will then be locked to the hub of the driving-wheel and will give it a forward motion. When the driving power is held stationary, the sprocket-wheel E will also become stationary and the driving-wheel will continue its forward movement, the dogs Q permitting the forward motion of the hub. During the forward motion of the sprocket-wheel the wedge-bearings K on the rotary disk-plate will run into the corresponding bearings J on the sprocket-wheel and the rotary disk-plate will be carried around with the sprocket-wheel, the dogs L then clicking past the clutch-teeth M on the stationary disk-plate F. When the sprocket-wheel becomes stationary, the rotary disk-plate will also become stationary, the sprocket-wheel, rotary disk-plate, and stationary disk-plate remaining in their then relative positions until the sprocket-wheel is moved forward or back. In this position of the mechanism the driving-wheel is left free to revolve and the vehicle will move forward without application of power. A hill may thus be coasted in bicycling without removing the feet from the pedals. If it is desired to apply the brake, a small backward turn of the pedals or other driving power will turn the sprocket-wheel backward, and the rotary disk-plate being prevented from backward rotation by the engagement of the dogs L with the clutch-teeth M on the stationary disk-plate F the wedge-bearings J will run up on the wedge-bearings K, thus forcing the inner face of the sprocket-wheel E against the friction-disk C and the outer face of the stationary disk-plate F against the friction-disk D, and the braking friction may thereafter be increased or diminished by the degree of motion in either direction imparted to the sprocket-wheel E. It will be seen that very little lateral motion is imparted to the sprocket-wheel, so that the drive-chain will maintain substantially true alinement at all times. In order that there may be as little lost motion as possible, I have provided the sprocket-wheel with an odd number of clutch-teeth and the hub of the friction-disk with an even number of dogs. As illustrated in Fig. 4, there are nine of the clutch-teeth P and four of the dogs Q. For the same reason I have provided the stationary disk-plate F with twelve of the clutch-teeth N and the rotary disk-plate with three of the dogs L.

While I prefer the manner of attaching my brake mechanism to the hub as illustrated in the drawings, other means of attachment may be employed, especially where the mechanism is to be applied to a driving-wheel the hub of which will not permit of this arrangement, and I do not therefore wish to be confined to the precise structural arrangement of these parts as shown herein; also, in place of the spring-actuated dogs Q and L engaging the clutch-teeth P and M, I may employ for the same purpose rollers running in incut wedge-bearings, as illustrated in Fig. 6, where $g$ represents the rotary disk-plate and $f$ the stationary disk-plate. The stationary disk-plate in this case is cut with a wedge-bearing inclined in the opposite direction to the clutch-teeth, as shown in Fig. 2. $l$ represents the roller, and it will be readily understood that when the rotary disk-plate moves forward the roller $l$ will run down the incline and permit said forward motion; but when the rotary disk-plate is moved backward by the action of the sprocket-wheel the roller will run up the wedge-bearings and lock $f$ and $g$ together. In the same way $e$ in Fig. 6 represents the sprocket-wheel, and $c$ the collar of the friction-disk C. When the sprocket-wheel is moved forward, the roller Q will run out on the wedge-bearing and lock $e$ and $c$ together. When $e$ is held stationary or moved backward, the roller Q will run down the wedge-bearing, allowing $c$ and the driving-wheel hub to turn forward.

Having thus described my improvements and without confining myself to the precise details of construction shown herein, what I claim as my invention, and desire to secure by Letters Patent, is—

1. The combination with a driving-wheel and driving means, of a sprocket-wheel loosely mounted on the hub of the driving-wheel, a clutch mechanism between the hub and sprocket-wheel, a friction-disk secured to the hub, a stationary disk-plate between the sprocket-wheel and friction-disk and a clutch-and-wedge mechanism between the stationary disk-plate and the sprocket-wheel, whereby the driving-wheel is released from the sprocket-wheel when the driving means is stationary and whereby friction is applied to the friction-disk to retard the driving-wheel when the driving means is reversed.

2. The combination with a driving-wheel and driving means, of a friction-disk secured to the hub of the driving-wheel, a sprocket-wheel loosely mounted on the hub, a stationary disk-plate, a rotary disk-plate loosely mounted on the hub between the sprocket-wheel and stationary disk-plate, a clutch mechanism between the sprocket-wheel and hub, a wedge-bearing between the sprocket-wheel and rotary disk-plate, and a clutch mechanism between the rotary disk-plate and stationary disk-plate whereby the driving-wheel is driven forward, released or retarded respectively as the sprocket-wheel is driven forward, held stationary or turned backward.

3. The combination with a driving-wheel and driving means, of two friction-disks secured to the hub of the driving-wheel and forming an annular runway or bearing, a sprocket-wheel and a rotary disk-plate, loosely mounted in said runway between the friction-disks, a stationary disk-plate between the rotary disk-plate and one of the friction-disks, a clutch mechanism between the sprocket-wheel and hub, a wedge-bearing between the sprocket-wheel and rotary disk-plate, and a clutch mechanism between the rotary disk-plate and stationary disk-plate whereby the driving-wheel is driven forward, released or retarded respectively as the sprocket-wheel is driven forward, held stationary or turned backward.

In testimony whereof I have affixed my signature in presence of two witnesses.

GEORGE E. MCELROY.

Witnesses:
O. S. DIVEN,
C. TRACEY STAGG.